UNITED STATES PATENT OFFICE 2,208,172

PROCESS FOR TREATING LIQUIDS

Oliver M. Urbain, Columbus, Ohio, assignor to Charles H. Lewis, Harpster, Ohio

No Drawing. Application May 10, 1938, Serial No. 207,164

19 Claims. (Cl. 210—24)

This invention relates to a process for liquid treatment. More particularly, it relates to the removal of undesirable anions such as sulfate, phosphate and fluoride ions from liquids by contacting the liquid containing such undesired ions with a particular anion exchange medium. This invention also relates to the recovery of valuable acids from liquids by an anion exchange process.

Specifically, the invention contemplates the effecting of anion exchange by the use of alkali treated asphaltic material. The materials employed are preferably prepared at temperatures below those effective to cause decomposition of the asphaltic materials.

Liquids containing certain anions such as sulfates are unsatisfactory for many uses because of their permanent hardness, and the removal of these undesirable anions presents a difficult problem. The present invention provides an exceedingly simple and inexpensive process for effecting the removal of such anions. The process will additionally remove other undesirable anions from the liquid being treated. For example, it has recently been found that potable waters in a number of communities contain fluoride anions in quantity sufficient to be detrimental to the health of consumers of such waters. By treatment of such waters with the materials prepared in accordance with the hereinafter disclosed process, the fluoride content can be reduced below the toxic point. The process of the present invention is further especially applicable to the recovery of acids in a highly efficient manner from solutions containing the same.

The invention here disclosed resides in the discovery that certain bituminous substances which I term "asphaltic materials," when treated with concentrated solutions of alkalies such as sodium or potassium hydroxide, at temperatures substantially below the fusing point of such materials, yield water insoluble anion exchange materials capable of effecting efficient anion exchange when contacted with liquids containing undesirable anions or acids which it is desired to remove or recover.

By the term "asphaltic materials" is meant those bituminous substances termed asphalts, asphaltites, and asphaltic pyrobitumens. The term "asphalts" includes a species of bitumens and also certain pyrogenous substances, of dark color, variable hardness, comparatively non-volatile; composed principally of hydrocarbons, substantially free from oxygenated bodies; containing relatively little to no crystallizable paraffin; sometimes associated with mineral matter, the non-mineral constituents being fusible, and largely soluble in carbon disulfide yielding water insoluble sulfonation products.

The term "asphaltites" includes that species of bitumens having similar properties to the asphalts except that the non-mineral constituents are difficultly fusible.

The term "asphaltic pyrobitumens" refers to those substances which, when subjected to heat or fire, will generate or become transformed into bodies resembling bitumens, and which are dark colored, comparatively hard and non-volatile solids; composed of hydrocarbons, substantially free from oxygenated bodies; sometimes associated with mineral matter, the non-mineral constituents being infusible and largely insoluble in carbon disulfide.

It will thus be seen that the common characteristics of the class of bituminous substances which are termed "asphaltic materials" are their semi-solid to solid consistency and their substantial freedom from contained oxygenated bodies. Included among the materials embraced by this term are the native asphalts such as those occurring naturally in a pure or fairly pure state and those associated naturally with a substantial proportion of mineral matter, the pyrogenous asphalts such as residues, obtained from distillation, blowing, etc., of petroleum and the pyrogenous treatment of wurtzilite; the asphalties, such as gilsonite, glance pitch, and grahamite; and the asphaltic pyrobitumens such as elaterite, wurtzilite, albertite, impsonite, and the asphaltic pyrobituminous shales. All of these materials, when treated with concentrated solutions of alkalies in accordance with the procedure to be described hereinbelow, yield materials which are effective for the treatment of liquids in accordance with my process. Such alkali treated materials are embraced by the hereinafter employed term "alkali treated asphaltic materials."

In the preparation of these new liquid purification reagents, asphaltic materials as hereinabove defined are treated with concentrated solutions of alkalis. The asphaltic materials are first granulated to produce a relatively fine powder which will range from approximately 10 to 50 mesh. The powdered asphaltic materials are then slowly added to a concentrated solution of sodium hydroxide or potassium hydroxide with constant stirring. After introduction of such materials to the alkali solution, the mass is slowly heated to a temperature of about 100° C., while being constantly agitated. The temperature prevailing in this step should not exceed 105° C. The reaction will be completed in about one hour. During the heating period, a curd is formed. After the reactions are completed, the curd which has been formed is removed and the excess alkali may again be used in the further treatment of additional asphaltic materials. The quantity of the alkali employed should, of course, at all times be substantially in excess of the total demand of the asphaltic materials.

After removal of the curd, it is thoroughly washed with water and broken up into small pieces, when it should be additionally washed until substantially free of alkali. The material, after being thus washed free of alkali, is dried at a temperature of around 105° C. and is then ready for use in liquid treatment processes. The specific strength of the alkali employed is not of much consequence except, of course, that the solution should be thoroughly concentrated.

The finished product produced in accordance with the above outlined procedure is about 25% greater in weight than the asphaltic material employed in its preparation and is about 100% greater in volume than the original asphaltic material. The physical properties of the finished product render it especially well adapted for use in water treatment.

It is of the utmost importance that the asphaltic materials not be subjected to heat sufficient to cause the same to undergo a change in composition. When an asphaltic material is heated to temperatures of the order of its fusing point, it undergoes a change in composition and is no longer particularly well adapted for use in my process. I regard the avoidance of the employment of excessive heat as a critical factor since I have found that where an alkali treatment of asphaltic materials is effected at temperatures of the order of their fusing point, the resultant material is much less efficient than is the alkali treated asphaltic material prepared in accordance with my hereinbefore described method. It thus appears that the naturally occurring volatile constituents in the asphaltic materials are responsible for the efficient liquid purification properties of such materials, when alkali treated, and care should be taken to retain these constituents. I base this belief upon the fact that I have found the native asphalts, the native asphaltites, and the naturally occurring asphaltic pyrobitumens to be somewhat superior to the pyrogenous asphalts, obtained by heat treatment of petroleum and pyrobitumens. It is believed that the application of heat causes a loss in the volatile constituents and a corresponding increase in the fixed carbon. I have found that the efficiency of my reagents, in removing anions or acids from liquids, is in inverse ratio to the fixed carbon contents thereof. Accordingly, it is one of the purposes of my invention to avoid excessive heat treatment of the asphaltic materials employed in order to maintain a low fixed carbon content therein.

Accordingly, the expression "alkali treated asphaltic materials" as hereinafter employed, is intended to designate such materials prepared at temperatures well below those which will effect a change in the composition of the bituminous substance.

In the application of the process to the treatment of liquids, either of two methods may be employed: (1) the liquid to be treated may be passed through a filter charged with alkali treated asphaltic material; or, (2) the powdered alkali treated asphaltic material may be added to the liquid with agitation in advance of a conventional coagulation step.

The choice between these methods will depend upon the nature of the liquid being treated and whether it is desired to recover the anions being extracted by exchange from the liquid being treated.

The following illustrative examples indicate the adaptation of alkali treated asphaltic materials in processes for the removal or the recovery of anions from liquids.

*Example 1*

An Egyptian variety of natural asphalt was alkali treated in accordance with the foregoing procedure. The granular material, after drying at a temperature of about 105° C., was added to a water containing 500.0 parts per million of permanent hardness determined as sulfate. Approximately 9 pounds of the alkali treated asphaltic material was added per thousand gallons of water and the mixture was agitated for a period of approximately 20 minutes. The water was then filtered to remove the reagent and the filtrate tested for its sulfate content by the barium chloride method. This operation effected a reduction in the sulfate content of the liquid treated from 500.0 parts per million in the untreated liquid to 46.8 parts per million in the treated liquid. The extremely high reduction in permanent hardness content of the liquid is believed attributable to the anion exchange capacity of the alkali treated asphaltic material.

*Example 2*

An alkali treated asphaltite, prepared by the reaction of a natural occurring gilsonite (such as that found in Utah) with concentrated sodium hydroxide in accordance with the procedure above described, was placed in a conventional water softening filter. Through this filter was then passed a raw water, similar to that treated in Example 1, containing 500.0 parts per million of permanent hardness determine as sulfate. The permanent hardness content of this water after treated with the alkali treated gilsonite, was found to be approximately 55.5 parts per million.

Examples 1 and 2 show that an alkali treated asphaltic material possesses an extremely high capacity for the removal of permanent hardness from water.

*Example 3*

A residual asphalt produced by the steam distillation of an asphaltic petroleum, was alkali treated by the procedure hereinbefore described and was then added in granular form to a liquid containing 500.0 parts per million of permanent hardness in quantities of approximately 12 pounds of reagent per thousand gallons of water, with agitation for a period of approximately 15 minutes. After filtration to remove the reagent, the permanent hardness content of the filtrate was determined and found to be 280.6 parts per million. It was thus seen that a pyrogenous asphalt, when alkali treated, possesses the properties of effecting anion exchange.

*Example 4*

A rock asphalt, i. e., a native asphalt associated with mineral matter such as sand, sandstone, limestone, etc., which had been refined by a distillation process, was alkali treated in accordance with the foregoing procedure. After drying at 105° C., the granular alkali treated refined asphalt was added to a liquid containing 500.0 parts per million of permanent hardness. After agitation and filtration, the filtrate was tested and found to contain approximately 132.4 parts per million of permanent hardness determined as sulfate.

The results of Examples 1 to 4 indicate that the naturally occurring asphaltic materials have a greater anion exchange capacity than do those asphaltic materials which have been heat treated. However, because of the availability of the latter as by-products from a number of commercial operations, it is believed that their utilization, when alkali treated, as anion exchange materials, is commercially practicable.

Example 5

Alkali treated gilsonite as used in Example 2, above, was placed in a conventional water softening apparatus and a liquid containing 250.0 parts per million of phosphate was passed through this filter. The effluent from this treatment was tested for phosphate content and it was found that 75% of the anions had been removed by contact with the alkali treated gilsonite prepared in accordance with the foregoing procedure. Not only was the phosphate content of the liquid materially lowered, but the removed phosphate ions were available for recovery by a process of regeneration of the exchange medium, as will be described below.

Example 6

A commercial water supply, which had been found to contain approximately 7.0 parts per million of fluoride ions, was treated with granular alkali treated natural asphalt, as used in Example 1 above, by the addition of the asphaltic material to the fluoride containing liquid. Approximately 10 pounds of the alkali treated natural asphaltum was added per thousand gallons of water and the mixture was agitated for a period of approximately 20 minutes. The fluoride content of the filtrate, after removal of the reagent by filtration, indicated that the fluoride ions had been reduced to approximately 0.8 part per million. Such a content of fluoride ions in the treated liquid is below the recognized toxic point of 1.0 part per million and accordingly such liquid, by this treatment had been made available for use as potable waters without the harmful effects which would have resulted from its use prior to the reduction in its fluoride content.

Methods for the regeneration of alkali treated asphaltic materials employed in accordance with the process of the present invention, involve the treatment of the exhausted materials with solutions of anion containing liquids such as sodium hydroxide and sodium chloride. The regenerated exchange material displays substantially the same capacity for anion exchange as does the initially prepared reagent. The choice of the regeneration liquid depends upon the nature of the anion desired in the exchange position in the reagent; the use of a 5% solution of sodium hydroxide places hydroxyl ions in the exchange medium, whereas the use of a sodium chloride solution for regeneration places chloride ions in the exchange position in the reagent.

When the process is employed for the recovery of acids from liquids, the acid containing liquid is first fully passed through the filter charged with an alkali treated asphaltic material. When the exchanger becomes exhausted, it can be regenerated in the manner above indicated. The acid is then recovered by acidifying the wash water employed in the regeneration of the exchange medium or by other conventional methods. Recovery is thus made possible because of the much higher concentration of the acids in the effluent of the regeneration treatment than the acid concentration in the original liquid.

For example, if the alkali treated asphaltic material had initially been employed to remove valuable anions such as phosphates, as shown in Example 5 above, the effluent from the regeneration wash will be found to be rich in phosphate ions. These may be recovered from the effluent obtained by the regeneration process, by acidification or other well known methods.

The foregoing description and examples which I have given are illustrative only and it is to be expressly understood that they are not to be considered as limiting this invention beyond the scope of the sub-joined claims.

Having thus described my invention, what I claim is:—

1. A process for treatment of liquids which comprises contacting said liquids with an alkali treated asphaltic material.

2. A process for the treatment of liquids comprising passing said liquids through a filter charged with an alkali treated asphaltic material.

3. A process for the treatment of liquids comprising adding an alkali treated asphaltic material to said liquids and thereafter removing said asphaltic material from said liquids.

4. A process for the treatment of liquids which comprises contacting said liquids with an asphaltic material which has been alkali treated at temperatures below that at which said asphaltic material loses its volatile constituents.

5. A process for the treatment of liquids which comprises contacting said liquids with an alkali treated asphaltic material, said asphaltic material characterized by its semi-solid to solid consistency and its substantial freedom from oxygenated bodies.

6. A process for the treatment of liquids which comprises contacting said liquids with an asphaltic material which has been alkali treated at a temperature below that at which said asphaltic material loses its volatile constituents, said bituminous substance characterized by its semi-solid to solid consistency and its substantial freedom from oxygenated bodies.

7. A process for the treatment of liquids which comprises contacting said liquids with an alkali treated asphalt.

8. A process for the treatment of liquids which comprises contacting said liquids with an alkali treated pyrogenous asphalt.

9. A process for the treatment of liquids which comprises contacting said liquids with an alkali treated natural asphalt.

10. A process for the treatment of liquids which comprises contacting said liquids with an alkali treated asphaltite.

11. A process for the treatment of liquids which comprises contacting said liquids with an alkali treated asphaltic pyrobitumen.

12. A process for effecting anion exchange in liquids which comprises contacting said liquids with an alkali treated asphaltic material.

13. A process for the removal of undesired anions from liquids which comprises contacting said liquids with an alkali treated asphaltic material.

14. A process for reducing permanent hardness in liquids which comprises contacting said liquids with an alkali treated asphaltic material.

15. A process for the removal of sulfates from liquids which comprises contacting said liquids with an alkali treated asphaltic material.

16. A process for the removal of fluorides from liquids which comprises contacting said liquids with an alkali treated asphaltic material.

17. A process for recovering acids from aqueous solution comprising effecting exchange of the anions of the acids with the anions of an alkali treated asphaltic material and recovering the anions from the asphaltic material.

18. A process for exchanging anions from aqueous solutions and effecting regeneration of the anion exchange medium, comprising first effecting exchange of anions with an alkali treated asphaltic material, and thereafter regenerating said alkali treated asphaltic material by treatment with a different anion containing liquid.

19. A process for recovering anions from aqueous solutions and effecting regeneration of the anion exchange medium, comprising first effecting exchange of anions with an alkali treated asphaltic material, thereafter regenerating said alkali treated asphaltic material by treatment with a different anion containing liquid, and recovering the originally exchanged anions from the effluent of the regeneration treatment.

OLIVER M. URBAIN.